United States Patent
Nilsson et al.

(10) Patent No.: US 11,288,944 B2
(45) Date of Patent: Mar. 29, 2022

(54) SYSTEM AND METHOD FOR FINDING A KEY

(71) Applicant: Ningbo Geely Automobile Research & Development Co., Ltd., Ningbo (CN)

(72) Inventors: Magnus Nilsson, Floda (SE); Erik Lindberg Nilsson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/239,571

(22) Filed: Apr. 24, 2021

(65) Prior Publication Data

US 2021/0241602 A1    Aug. 5, 2021

Related U.S. Application Data

(63) Continuation of application No. PCT/CN2019/114205, filed on Oct. 30, 2019.

(30) Foreign Application Priority Data

Nov. 2, 2018    (EP) .................................... 18204218

(51) Int. Cl.
    *G08B 21/24*    (2006.01)
    *H04W 76/14*   (2018.01)
    *G08B 3/10*     (2006.01)

(52) U.S. Cl.
    CPC .............. *G08B 21/24* (2013.01); *G08B 3/10* (2013.01); *H04W 76/14* (2018.02)

(58) Field of Classification Search
    CPC .......... G08B 21/24; G08B 3/10; G08B 25/10; H04W 76/14; B60R 2325/205; B60R 25/245
    See application file for complete search history.

(56) References Cited

U.S. PATENT DOCUMENTS

| | | | |
|---|---|---|---|
| 9,187,061 B2 * | 11/2015 | Grimm | B60R 25/102 |
| 10,102,749 B1 * | 10/2018 | Wagner | G08G 1/13 |

(Continued)

FOREIGN PATENT DOCUMENTS

| | | |
|---|---|---|
| CN | 105915487 A | 8/2016 |
| CN | 207758747 U | 8/2018 |
| WO | 2012126962 A1 | 9/2012 |

OTHER PUBLICATIONS

International Search Report and Written Opinion from corresponding International Application No. PCT/CN2019/114205, dated Jan. 17, 2020, 9 pages.

(Continued)

*Primary Examiner* — Munear T Akki
(74) *Attorney, Agent, or Firm* — Tucker Ellis LLP

(57) ABSTRACT

A key localization system for finding a vehicle key. The system includes a key unit, a first communication unit, at least one second communication unit, and a processing circuitry operatively connected to the first communication unit and configured to cause the key localization system to send, via the first communication unit, a detect key signal and receive, via the first communication unit, in response to that the key unit has received the detect key signal, a found key signal from at least one of the key unit and the second communication unit.

12 Claims, 5 Drawing Sheets

(56) References Cited

U.S. PATENT DOCUMENTS

| | | | | |
|---|---|---|---|---|
| 2003/0134600 | A1* | 7/2003 | Picone | G07C 9/00182 |
| | | | | 455/68 |
| 2005/0248484 | A1* | 11/2005 | Stoschek | G08G 1/20 |
| | | | | 342/357.29 |
| 2007/0090965 | A1* | 4/2007 | McCall | G08B 21/24 |
| | | | | 340/8.1 |
| 2008/0157919 | A1 | 7/2008 | Sugiura | |
| 2008/0266091 | A1* | 10/2008 | Hill | G08B 21/24 |
| | | | | 340/571 |
| 2009/0207050 | A1 | 8/2009 | Arpin | |
| 2010/0033342 | A1 | 2/2010 | Patenaude | |
| 2012/0214545 | A1* | 8/2012 | Johnson | H04M 1/2155 |
| | | | | 455/556.1 |
| 2015/0109116 | A1* | 4/2015 | Grimm | B60R 25/1001 |
| | | | | 340/426.18 |
| 2015/0379859 | A1* | 12/2015 | Nespolo | G08B 21/24 |
| | | | | 340/539.32 |
| 2016/0110988 | A1* | 4/2016 | Nixon | B60R 25/24 |
| | | | | 340/539.32 |
| 2016/0335877 | A1* | 11/2016 | Steven | G08B 21/24 |
| 2016/0335878 | A1* | 11/2016 | Steven | G01S 5/00 |
| 2018/0096584 | A1* | 4/2018 | Choi | G08B 7/00 |

OTHER PUBLICATIONS

International Preliminary Report on Patentability from corresponding International Application No. PCT/CN2019/114205, dated Dec. 21, 2020, 19 pages.

* cited by examiner

SYSTEM AND METHOD FOR FINDING A KEY

RELATED APPLICATION DATA

This application is a continuation of International Patent Application No. PCT/CN2019/114205, filed Oct. 30, 2019, which claims the benefit of European Patent Application No. 18204218.4, filed Nov. 2, 2018, the disclosures of which are incorporated herein by reference in their entireties.

TECHNICAL FIELD

The disclosure pertains to the field of using wireless communication for finding a lost key.

BACKGROUND

Most vehicles require a key for unlocking and locking doors and also for operating the vehicle via the use of an ignition lock. Traditionally, vehicle keys are utilizing a mechanical lock function that requires an insertion of a physical key into a physical lock. There are also vehicle keys that are wirelessly connected to the vehicle and configured to unlock and operate the vehicle without a particular insertion of the physical key in a physical lock. There are also keys that require a combination of the physical and wireless connection. For security reasons, a vehicle key needs to be carried by a vehicle occupant when the vehicle occupant is locking and leaving the vehicle. It is easy to misplace the vehicle key, or by mistake drop the vehicle key. This means that the vehicle will remain locked and the vehicle occupant cannot access and operate the vehicle without the vehicle key. In such instances the vehicle occupant needs to search for the lost vehicle key. Finding a lost vehicle key can sometimes be stressful and take a lot of time. Sometimes the vehicle key is not found at all. In the case the vehicle key is not found, it can be uncomfortable knowing that someone else may have found the vehicle key. Unless there is any extra vehicle key that is accessible, a lost vehicle key may cause a lot of problem or even require a vehicle manufacturer to help getting access to the vehicle, change locks etc. Having an easy way to find a lost vehicle key would be helpful for a lot of people.

SUMMARY

Today there is a demand for an easy way to a lost vehicle key. This disclosure provides system and method for finding a key using wireless communication. The inventors have realized that the use of wireless communication can assist a vehicle occupant to find a lost vehicle key.

An object of the present disclosure is to provide a key localization system and method for finding a vehicle key which seek to mitigate, alleviate, or eliminate one or more of the above-identified deficiencies in the art and disadvantages singly or in any combination.

The disclosure proposes a key localization system for finding a vehicle key, wherein the key localization system comprises a key unit connected to the vehicle key and configured for wireless communication. The key localization system further comprises a first communication unit configured for receiving input indicative of a request to find the vehicle key and configured to establish wireless communication with the key unit. The key localization system further comprises at least one second communication unit comprised in a vehicle configured for wireless communication with the first communication unit and the key unit. The key localization system further comprises a processing circuitry operatively connected to the first communication unit and configured to cause the key localization system to send, via the first communication unit, a detect key signal configured to be received by at least one of the key unit and the second communication unit and receive, via the first communication unit, in response to that the key unit has received the detect key signal, a found key signal from at least one of the key unit and the second communication unit. One advantage with that the first communication unit, the second communication unit and the key unit are configured to be in wireless communication with each other is that the vehicle occupant, that is searching for the lost vehicle key, can be helped in the search for the lost vehicle key by extending a visual search area by a search area that is covered using wireless communication that covers a broader search area.

According to one aspect the first communication unit is configured to be associated with the key unit, the first communication unit being comprised in a first vehicle and the at least one second communication unit being comprised in a second vehicle. In one example, the association between the first communication unit and the key unit may only be known to the first communication unit comprised in the first vehicle and the key unit so that the association maintains secret for at least the second communication unit being comprised in a second vehicle.

According to an aspect, the first communication unit is configured to be associated with the key unit and wherein the first communication unit is comprised in a portable communication device. This means, according to an aspect, that a vehicle occupant can have a portable communication device, such as a smartphone or tablet that is associated with the key unit used together with a vehicle that the vehicle occupant is using and/or owning.

According to an aspect the second communication unit is configured to establish wireless communication with the key unit. This means for example that not only the first communication unit is configured to establish wireless communication with the key unit but also the second communication unit is configured to establish wireless communication with the key unit so that the search area where the search for the lost vehicle key can be performed can be extended by the wireless communication coverage of the second communication unit.

According to an aspect the found key signal received from at least one of the key unit and the second communication unit further comprises vehicle position information for determining the geographical location of the vehicle comprising the second communication unit. The vehicle position information e.g. helps the vehicle occupant in search for the lost vehicle key to understand where the vehicle key has been found.

According to an aspect the processing circuitry is further configured to send, via the first communication unit, a key alert signal configured to be received by at least one of the key unit and the second communication unit and in response to receiving the key alert signal at the key unit, generate an alert in the key unit for indicating the location of the key unit to a person in the vicinity of the key unit. This means for example that the vehicle occupant can initiate an alert in the key unit via the first communication unit that will simplify the search for the lost vehicle key.

According to an aspect the second communication unit is configured to receive and re-send at least one of the detect key signal and the found key signal. In other words, according to one aspect, a detect key signal and/or the found key signal can be received and re-sent by any second communication unit in order to reach the first communication unit.

According to an aspect at least one of the detect key signal, the found key signal, and the key alert signal further comprise a time stamp for defining the lifetime of at least one of the detect key signal, the found key signal, and the key alert signal. One effect with the use of a time stamp is that at least one of the key signal, the found key signal, and the key alert signal will not live forever, that may otherwise cause congestion in the any communication network.

According to an aspect at least one of the detect key signal, the found key signal, and the key alert signal further comprise a counter for counting down the number of re-transmissions of at least one of the detect key signal, the found key signal, and the key alert signal. One effect with the use of a time stamp is that at least one of the key signal, the found key signal, and the key alert signal will not live forever, that may otherwise cause congestion in the any communication network.

According to an aspect the second communication unit is configured to receive the found key signal and the processing circuitry is operatively connected to the second communication unit configured to determine if any vehicle position information is existing in the found key signal and in the case the found key signal does not comprise any existing vehicle position information, add vehicle position information to the found key signal before re-sending the found key signal via the second vehicle communication unit. According to an aspect the second communication unit is configured to receive the found key signal and the processing circuitry is operatively connected to the second communication unit configured to determine if any vehicle position information is existing in the found key signal and in the case the found key signal comprise any existing vehicle position information re-sending the found key signal via the vehicle communication unit. In other words, according to an aspect, in the case the second communication unit is picking up the found key signal directly from the key unit, then the second communication unit will add vehicle position information to the found key signal before re-sending the found key signal and in the case the second communication unit is not picking up the found key signal directly from the key unit, then the second communication unit not add vehicle position information to the found key signal before re-sending the found key signal.

According to an aspect the key localization system further comprises a server. The server is configured for wireless communication with at least one of the first communication unit and the at least one second communication unit comprised in the vehicle. The processing circuitry operatively connected to the first communication unit is further configured to receive at the server, a find key request signal, sent from the first communication unit, comprising key identification data and position information data and send from the server a detect key signal configured to be received by at least one of the first communication unit and the second communication unit. One advantage with the server is that the search for the lost vehicle key does not need to be initiated at a geographical location that is dependent on the geographical location of the first communication unit.

According to an aspect the position information data of the find key request signal is one of the position of the first communication unit or a position information data entered by a user of the first communication unit. This means that in one example the position of the first communication unit may be included automatically by the first communication unit based on position information data obtained from a position information unit connected to the first communication unit. This also means that in another example a user can manually enter the position information in the case the position of the first communication unit is not relevant.

According to an aspect the detect key signal is configured to be received by at least one of the first communication unit and the second communication unit if the at least one of the first communication unit and the second communication unit is located within a predetermined distance from the geographical position given in the position information data of the find key request signal. In other words, according to an aspect, the detect key signal is only sent to the first communication unit and any second communication unit if they are within a certain distance from the geographical position given in the position information data of the find key request signal.

According to an aspect the first communication unit and the second communication unit are configured to re-send the detect key signal to any further second communication unit arranged in a further vehicle, that is outside of the predetermined distance from the geographical position given in the position information data of the find key request signal. In other words, according to an aspect, the detect key signal may be sent to any further second communication unit that is outside of the distance from the geographical position given in the position information data of the find key request signal.

According to an aspect the processing circuitry is further configured to send the found key signal to the server via at least one of the first communication unit and the second communication unit, receive the found key signal at the server and send a find key response signal from the server to the first communication unit. In one example, a notification message based on the find key response signal can be presented to the vehicle occupant via a user interface of the first communication unit.

According to an aspect the key unit is further configured to receive input from a user to manually activate the found key signal. An advantage with this aspect is that if the vehicle key is lost and found by a person, that person can activate a continuously transmission of a found key signal. The key unit may have a button that says e.g. "press here" or "finder of this key press here to notify owner" etc.

According to an aspect the key localization system comprises a plurality of second communication units, and wherein the second communication units are comprised in one vehicle each and wherein each one of the second communication units is configured for wireless communication with at least one other second communication unit. This means that plural vehicles can assist in the search for the lost vehicle key.

The disclosure further proposes a method for finding a vehicle key. The method comprising the step sending via a first communication unit, a detect key signal configured to be received by at least one of a key unit and a second communication unit and the step receiving via the first communication unit, in response to that the key unit has received the detect key signal, a found key signal from at least one of the key unit and the second communication. One advantage with that the first communication unit, the second communication unit and the key unit are configured to be in wireless communication with each other is that the vehicle occupant, that is searching for the lost vehicle key, can be helped in the search for the lost vehicle key by extending a visual search area by a search area that is covered using wireless communication that covers a broader search area.

According to an aspect the method further comprising the step sending via the first communication unit, a key alert signal configured to be received by at least one of the key unit and the second communication unit and in response to receiving the key alert signal at the key unit, the step generating an alert in the key unit for indicating the location of the key unit to a person in the vicinity of the key unit. This means for example that the vehicle occupant can initiate an alert in the key unit via the first communication unit that will simplify the search for the lost vehicle key.

According to an aspect the method further comprising the step receiving at a server, a find key request signal, sent from the first communication unit, comprising key identification data and position information data, and the step sending from the server a detect key signal configured to be received by at least one of the first communication unit and the second communication unit. One advantage with this aspect is that the search for the lost vehicle key does not need to be initiated at a geographical location that is dependent on the geographical location of the first communication unit.

According to an aspect the method further comprising the step sending the found key signal to a server via at least one of the communication unit and the vehicle communication unit, receiving the found key signal at the server, and the step sending a find key response signal from the server to the first communication unit. In one example a notification message based on the find key response signal can be presented to the vehicle occupant via a user interface of the first communication unit.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
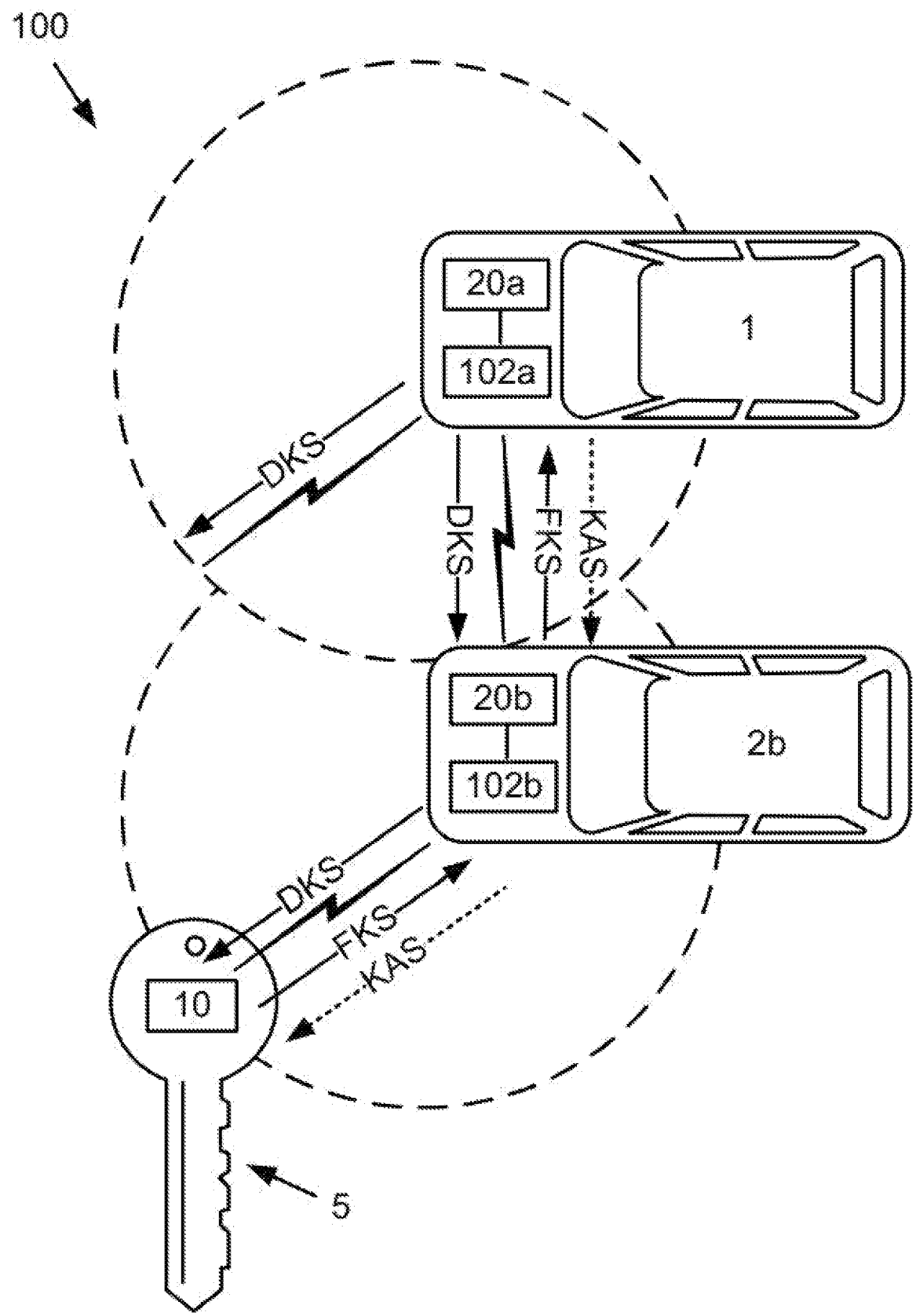
FIG. 1A illustrates a key localization system with the communication unit comprised in a first vehicle and illustrated signals according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today there is a demand for an easy way to find a lost vehicle key. This disclosure provides system and method for finding a key using wireless communication. The inventors have realized that the use of wireless communication can assist a vehicle occupant to find a lost vehicle key.

Most vehicles require a key for unlocking and locking doors and also for operating the vehicle via the use of an ignition lock. Traditionally, vehicle keys are utilizing a mechanical lock function that requires an insertion of a physical key into a physical lock. There are also vehicle keys that are wirelessly connected to the vehicle and configured to unlock and operate the vehicle without a particular insertion of the physical key in a physical lock. There are also keys that require a combination of the physical and wireless connection.

An object of the present disclosure is to provide a key localization system and method for finding a vehicle key which seek to mitigate, alleviate, or eliminate one or more of the above-identified deficiencies in the art and disadvantages singly or in any combination.

Figure 1B:
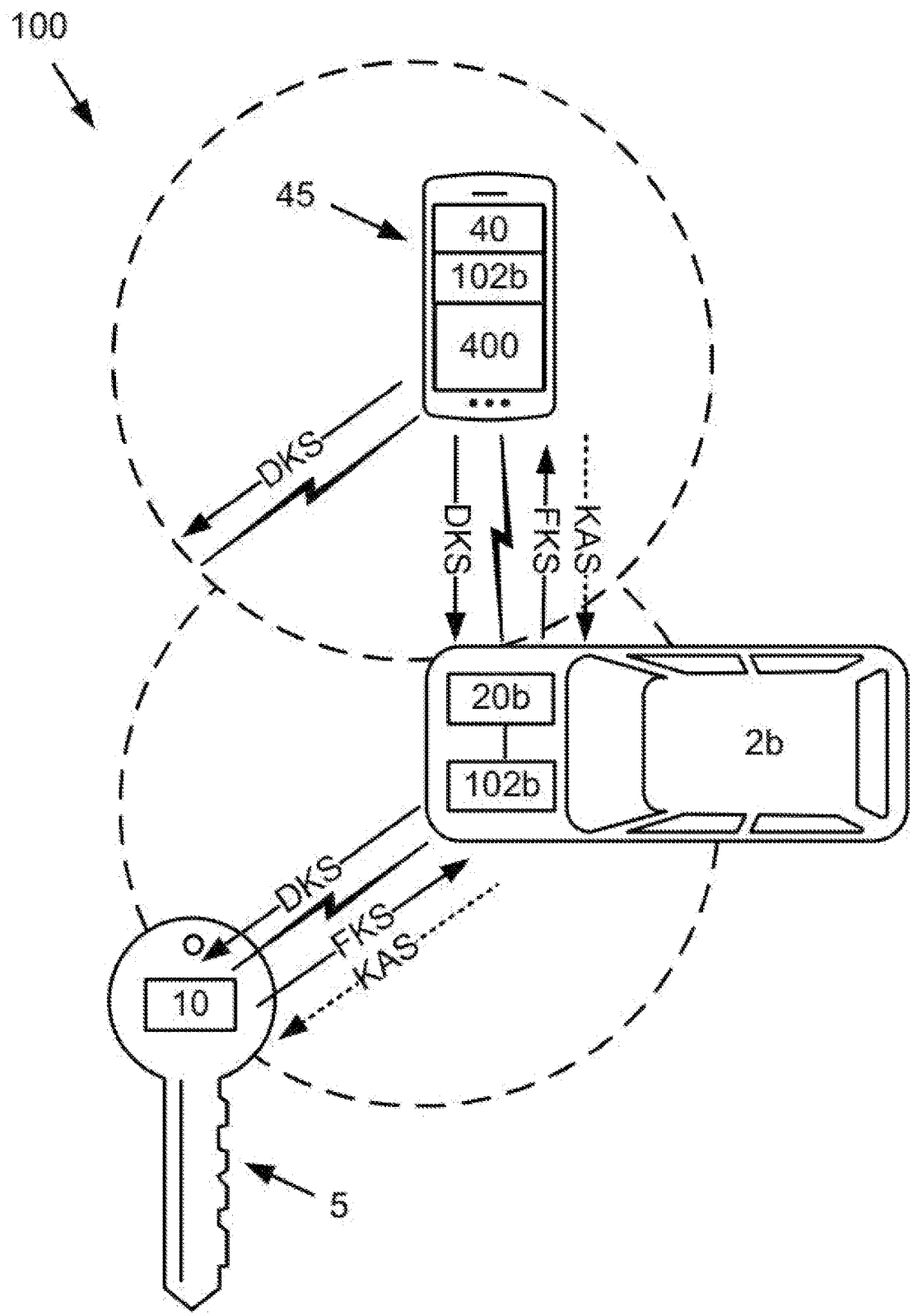
FIG. 1B illustrates a key localization system with the communication unit comprised in a portable communication device and illustrated signals according to an aspect of the disclosure.

The disclosure proposes a key localization system 100, illustrated in FIGS. 1A and 1B, for finding a vehicle key 5, wherein the key localization system 100 comprises a key unit 10 connected to the vehicle key 5 and configured for wireless communication. According to an aspect the vehicle key 5 comprises a key unit 10. According to an aspect the key unit 10 is configured to establish wireless communication via a wireless local area network such as a Wireless Local Area Network, WLAN, Bluetooth™, ZigBee, Ultra- Wideband, Near Field Communication, NFC, Radio Frequency Identification, RFID, or similar network.

According to an aspect the key unit 10 is one of a plurality of key units connected to different vehicle keys 5 associated with one vehicle. In an example one key unit 10 is in the possession of one vehicle occupant while another key unit is in the possession of another vehicle occupant. According to an aspect the key unit is associated with a key identification data. According to an aspect plurality of key units are associated with different key identification data.

The key localization system 100 further comprises a first communication unit 20a, 40 configured for receiving input indicative of a request to find the vehicle key 5 and configured to establish wireless communication with the key unit 10. The key localization system 100 further comprises at least one second communication unit 20b, 20c, 20d, . . . , 20n comprised in a vehicle 2b, 2c, 2d, . . . , 2n configured for wireless communication with the first communication unit 20a, 40 and the key unit 10. According to an aspect the first communication unit 20a, 40 and the at least one second communication unit 20b, 20c, 20d, . . . , 20n are configured to establish wireless communication via a wireless local area network. According to an aspect the first communication unit 20a, 40 and the at least one second communication unit 20b, 20c, 20d, . . . , 20n are configured to establish wireless communication via a wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network.

According to an aspect the first communication unit 20a, 40 and the at least one second communication unit 20b, 20c, 20d, . . . , 20n are configured to establish wireless communication via both a wireless local area network and a wireless wide area network.

According to an aspect the first communication unit 20a, 40 further comprising a user interface configured to receive input from a user and to output information to a user. According to an aspect the user is a vehicle occupant. The user interface 400 is illustrated in FIG. 1B as the touch display of a smartphone. The user interface of the first communication unit 20a comprised in the first vehicle 1 is not illustrated in the Figures, but may be in the form of a touch display integrated with the vehicle entertainment system.

The key localization system 100 further comprises a processing circuitry 102a, 102b, 102c operatively connected to the first communication unit 20a, 40 and configured to cause the key localization system 100 to send, via the first communication unit 20a, 40, a detect key signal DKS configured to be received by at least one of the key unit 10 and the second communication unit 20b, 20c, 20d, . . . , 20n and receive, via the first communication unit 20a, 40, in response to that the key unit 10 has received the detect key signal DKS, a found key signal FKS from at least one of the key unit 10 and the second communication unit 20b, 20c, 20d, . . . , 20n. According to an aspect the detect key signal DKS and the found key signal FKS are sent via the wireless local area network. In other words the detect key signal DKS and the found key signal FKS have a range that is defined by the radio coverage of the wireless local area network. In FIGS. 1A and 2b the radio coverage is illustrated with the dotted rings. As illustrated for example in FIG. 1A, the detect key signal DKS is sent and only picked up by the second communication unit 20b that is within radio coverage of the first communication unit 20a.

According to an aspect the second communication unit 20b, 20c, 20d, . . . , 20n is configured to establish wireless communication with the key unit 10. This means for example that not only the first communication unit 20a, 40 is configured to establish wireless communication with the key unit 10 but also the second communication unit 20b, 20c, 20d, . . . , 20n is configured to establish wireless communication with the key unit 10 so that the search area where the search for the lost vehicle key can be performed can be extended by the wireless communication coverage of the second communication unit 20b, 20c, 20d, . . . , 20n.

According to an aspect the key localization system 100 further comprising a position information unit configured to obtain a geographical location. According to an aspect the position information unit is arranged at the first communication unit 20a, 40 and configured to determine the geographical location of the first communication unit 20a, 40.

According to an aspect the processing circuitry 102a, 102b, 102c is operatively connected to the position information unit and the first communication unit 20a, 40 and configured to cause the key localization system 100 to establish wireless communication between the first communication unit 20a, 40 and the key unit 10, and in accordance with that wireless communication has been established, generate a key unit position information data based on position information data obtained from the position information unit for associating the key unit 10 with the current geographical location of the first communication unit 20a, 40.

According to an aspect in accordance with that the established wireless communication between the first communication unit 20a, 40 and the key unit 10 is disconnected, the key localization system 100 is configured to generate a key unit position information data based on position information data obtained from the position information unit for associating the key unit 10 with the last known geographical location of the first communication unit 20a, 40, when wireless communication was established between the key unit 10 and the first communication unit 20a, 40.

According to an aspect the key unit position information data is dependent on the key identification data. According to an aspect plurality of key units are associated with different key identification data and different key unit position information data. In an example one key unit 10 is in the possession of one vehicle occupant and is associated with one key unit position information data while another key unit is in the possession of another vehicle occupant and is associated with another key unit position information data. The last known position of one key unit may hence be different from the last known position of the other key unit. As illustrated in FIG. 1A, the key unit 10 is out of radio coverage of the first communication unit 20a. Hence, the detect key signal DKS is picked up by the second communication unit 20b that re-sends the detect key signal DKS and this time the key unit 10 is within radio coverage of the second communication unit 20b so that the key unit 10 can receive the detect key signal DKS.

FIG. 1A illustrates that in response to receiving the detect key signal DKS at the key unit 10, the key unit 10 sends a found key signal FKS. In the illustration in FIG. 1A the found key signal FKS cannot reach the first communication unit 20a that is out of radio coverage of the key unit 10. However, the second communication unit 20b can pick up the found key signal FKS form the key unit 10. The second communication unit 20b re-sends the found key signal FKS and this time the first communication unit 20a is within radio coverage and can pick up the found key signal FKS originating from the key unit 10.

One advantage with that the first communication unit 20a, 40, the second communication unit 20b, 20c, 20d, ..., 20n and the key unit 10 are configured to be in wireless communication with each other is that the vehicle occupant, that is searching for the lost vehicle key 5, can be helped in the search for the lost vehicle key by extending a visual search area by a search area that is covered using wireless communication that covers a broader search area.

According to one aspect the first communication unit 20a is configured to be associated with the key unit 10, the first communication unit 20a being comprised in a first vehicle 1, as illustrated in FIG. 1A, and the at least one second communication unit 20b, 20c, 20d, ..., 20n being comprised in a second vehicle 2b, 2c, 2d, ..., 2n.

In one example, the association between the first communication unit 20a and the key unit 10 may only be known to the first communication unit 20a comprised in the first vehicle 1 and the key unit 10 so that the association maintains secret for at least the second communication unit 20b, 20c, 20d, ..., 20n being comprised in a second vehicle 2b, 2c, 2d, ..., 2n. In one example the key unit 10 is associated with the first vehicle 1 that e.g. is the vehicle used or owned by the vehicle occupant. According to an aspect the association comprises an identification code that links the key unit 10 and the first communication unit 20a in the first vehicle 1. According to an aspect the association is generated during the manufacture of the first vehicle 1. According to an aspect, a key unit 10 can be replaced and the association between a new key unit 10 and the first communication unit 20a of the first vehicle 1 can be generated after sales of the vehicle 1.

According to an aspect, the first communication unit is configured to be associated with the key unit 10 and wherein the first communication unit 40 is comprised in a portable communication device 45, as illustrated in FIG. 1B. This means, according to an aspect, that a vehicle occupant can have a portable communication device, such as a smartphone or tablet that is associated with the key unit 10 used together with a vehicle that the vehicle occupant is using and/or owning.

According to an aspect the association comprises an identification code that links the key unit 10 and the first communication unit 20a in the first vehicle 1. According to an aspect the association is generated via a user account accessible by the portable communication device 45. According to an aspect the association is entered manually by a vehicle occupant via a user interface 400 of the portable communication device 45. According to an aspect the association is generated during an association session when the portable communication device 45 is within the wireless communication coverage of the key unit 10.

According to an aspect the found key signal FKS received from at least one of the key unit 10 and the second communication unit 20b, 20c, 20d, ..., 20n further comprises vehicle position information for determining the geographical location of the vehicle 2b, 2c, 2d, ..., 2n comprising the second communication unit 20b, 20c, 20d, ..., 20n. The vehicle position information e.g. helps the vehicle occupant in search for the lost vehicle key to understand where the vehicle key has been found. According to an aspect a user interface 400 of the first communication unit 20a, 40 is configured to display a geographical location on a map based on the vehicle position information in the found key signal FKS.

Figure 1C:
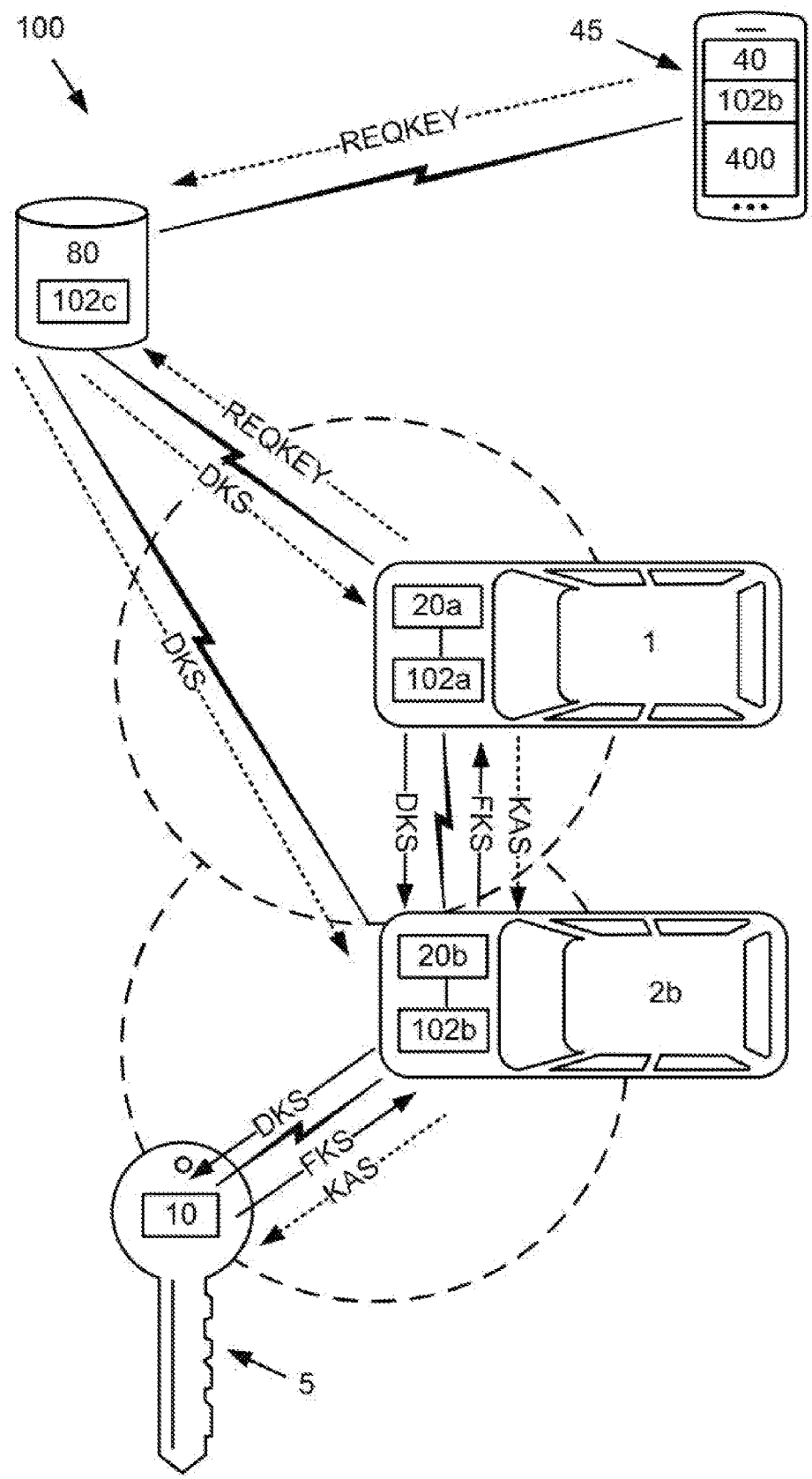
FIG. 1C illustrates a key localization system with a server and illustrated signals according to an aspect of the disclosure.

According to an aspect the processing circuitry 102a, 102b, 102c is further configured to send, via the first communication unit 20a, 40, a key alert signal KAS, illustrated in FIG. 1A-1C, configured to be received by at least one of the key unit 10 and the second communication unit 20b, 20c, 20d, ..., 20n and in response to receiving the key alert signal KAS at the key unit 10, generate an alert in the key unit 10 for indicating the location of the key unit 10 to a person in the vicinity of the key unit 10. This means for example that the vehicle occupant can initiate an alert in the key unit 10 via the first communication unit 20a, 40 that will simplify the search for the lost vehicle key. According to an aspect the first communication unit 20a, 40 is further configured for receiving input indicative of a request to send a key alert signal KAS. According to an aspect the processing circuitry 102a, 102b, 102c is further configured to receive the found key signal FKS from at least one of the key unit 10 and the second communication unit 20b, 20c, 20d, ..., 20n and display, via a user interface 400, a selectable icon configured for receiving input indicative of a request to send a key alert signal KAS.

According to an aspect the key alert signal KAS is generated automatically when the first communication unit 20a, 40 receives the found key signal FKS from at least one of the key unit 10 and the second communication unit 20b, 20c, 20d, ..., 20n.

According to an aspect the second communication unit 20b, 20c, 20d, ..., 20n is configured to receive and re-send at least one of the detect key signal DKS and the found key signal FKS. In other words, according to one aspect, a detect key signal DKS and/or the found key signal FKS can be received and re-sent by any second communication unit 20b, 20c, 20d, ..., 20n in order to reach the first communication unit 20a, 40. According to an aspect the second communication unit 20b, 20c, 20d, ..., 20n is configured to receive and re-send the key alert signal KAS.

According to an aspect at least one of the detect key signal DKS, the found key signal FKS, and the key alert signal KAS further comprise a time stamp for defining the lifetime of at least one of the detect key signal DKS, the found key signal FKS, and the key alert signal KAS. According to an aspect the lifetime is a preset time value. According to an aspect the lifetime is manually set time value via a lifetime setting by input from a user via a user interface 400. One effect with the use of a time stamp is that at least one of the key signal DKS, the found key signal FKS, and the key alert signal KAS will not live forever, that may otherwise cause congestion in the any communication network.

According to an aspect at least one of the detect key signal DKS, the found key signal FKS, and the key alert signal KAS further comprise a counter for counting down the number of re-transmissions of at least one of the detect key signal DKS, the found key signal FKS, and the key alert signal KAS. According to an aspect the counter for counting down the number of re-transmissions begins at a preset numeric value. According to an aspect the counter for counting down the number of re-transmissions begins at a numeric value manually set via a lifetime setting by input from a user via a user interface 400. In one aspect this eliminates the number of "jumps" a signal can travel via re-sending of the signal. One effect with the use of a time stamp is that at least one of the key signal DKS, the found key signal FKS, and the key alert signal KAS will not live forever, that may otherwise cause congestion in the any communication network.

According to an aspect the second communication unit 20b, 20c, 20d, ..., 20n is configured to receive the found key signal FKS and the processing circuitry 102a, 102b, 102c is operatively connected to the second communication unit 20b, 20c, 20d, . . . , 20n configured to determine if any vehicle position information is existing in the found key signal FKS and in the case the found key signal FKS does not comprise any existing vehicle position information, add vehicle position information to the found key signal FKS before re-sending the found key signal FKS via the second vehicle communication unit 20b, 20c, 20d, . . . , 20n.

Figure 2:
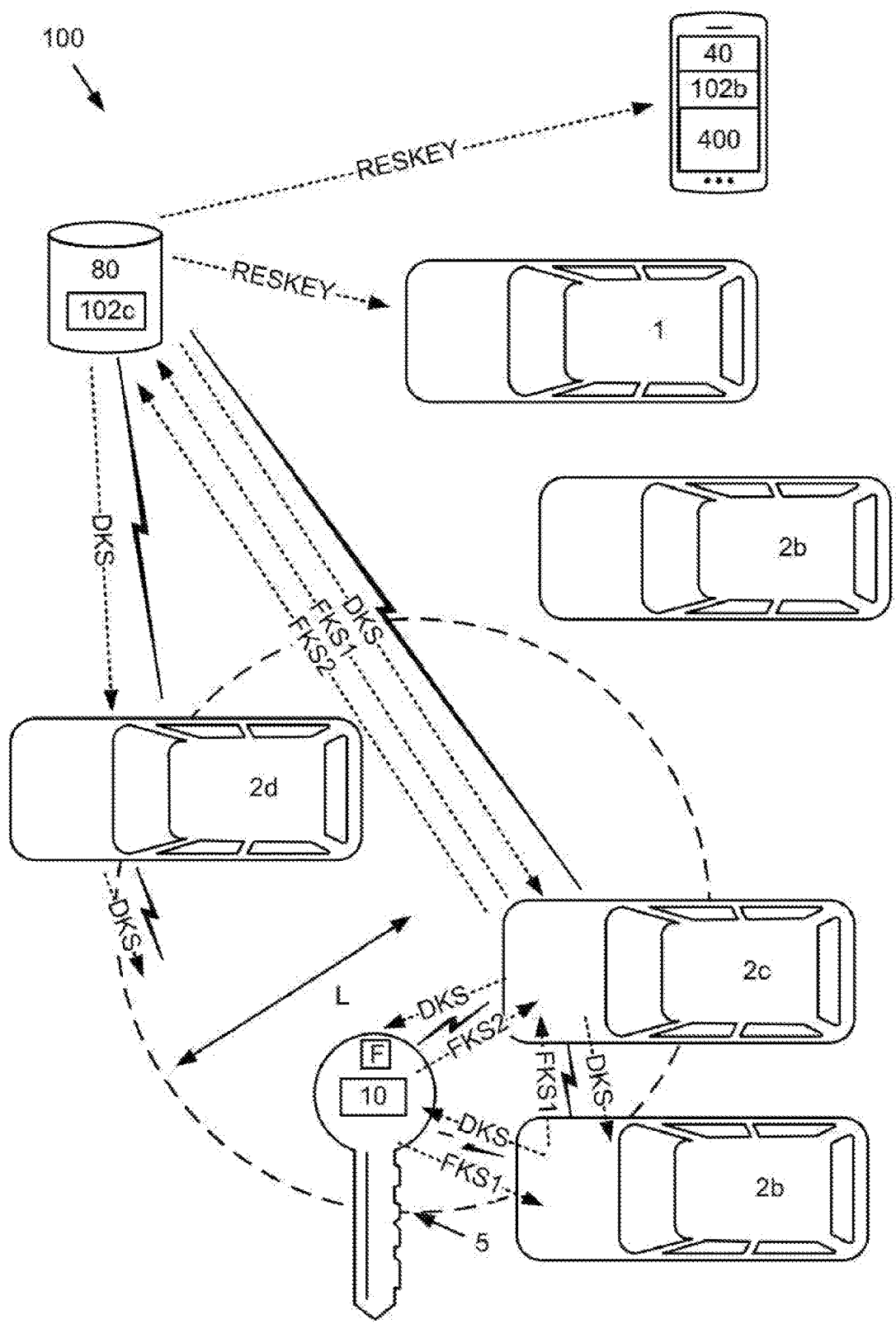
FIG. 2 illustrates a key localization system with a server and illustrated signals according to an aspect of the disclosure.

According to an aspect the second communication unit 20b, 20c, 20d, . . . , 20n is configured to receive the found key signal FKS and the processing circuitry 102a, 102b, 102c is operatively connected to the second communication unit 20b, 20c, 20d, . . . , 20n configured to determine if any vehicle position information is existing in the found key signal FKS and in the case the found key signal comprise any existing vehicle position information re-sending the found key signal FKS via the vehicle communication unit 20b. In other words, according to an aspect, in the case the second communication unit 20b, 20c, 20d, . . . , 20n is picking up the found key signal FKS directly from the key unit 10, then the second communication unit 20b, 20c, 20d, . . . , 20n will add vehicle position information to the found key signal FKS before re-sending the found key signal FKS and in the case the second communication unit 20b, 20c, 20d, . . . , 20n is not picking up the found key signal FKS directly from the key unit 10, then the second communication unit 20b, 20c, 20d, . . . , 20n not add vehicle position information to the found key signal FKS before re-sending the found key signal FKS. The above can be exemplified and explained with help from the illustration of FIG. 2. In FIG. 2 the found key signal received from the key unit 10 by one second vehicle 2c is illustrated as "FKS2". The second vehicle 2c in this example is the first vehicle to pick up the found key signal "FKS2". Hence, the second vehicle 2c adds the vehicle position information to the found key signal "FKS2" before re-sending the found key signal "FKS2" via the second vehicle communication unit.

Further, another found key signal illustrated as "FKS1" is also received by the second vehicle 2c. However, this found key signal "FKS1", has first been received by another second vehicle 2b. Hence, in this case, the other second vehicle 2b added the vehicle position information to the found key signal "FKS1" before re-sending the found key signal "FKS1" that was then picked up by the second vehicle 2c. In the example of "FKS1" the second vehicle 2c will hence not add any vehicle position information to the found key signal "FKS1" but instead just re-send the found key signal "FKS1". One effect of this is that a plurality of found key signals with different vehicle position information can be generated. This means that plural second vehicles have been the first to pick up the found key signal, which means that it can be easier to narrow down the search area by a plurality of vehicle position information.

According to an aspect, as illustrated in FIG. 1C, the key localization system 100 further comprises a server 80. The server 80 is configured for wireless communication with at least one of the first communication unit 20a, 40 and the at least one second communication unit 20b, 20c, 20d, . . . , 20n comprised in the vehicle 2b, 2c, 2d, . . . , 2n. According to an aspect the server 80 is configured to communicate wirelessly with at least one of the first communication unit 20a, 40 and the at least one second communication unit 20b, 20c, 20d, . . . , 20n comprised in the vehicle 2b, 2c, 2d, . . . , 2n via a wireless wide area network. The processing circuitry 102a, 102b, 102c operatively connected to the first communication unit 20a, 40 is further configured to receive at the server 80, a find key request signal REQKEY, sent from the first communication unit 20a, 40, comprising key identification data and position information data and send from the server 80 a detect key signal DKS configured to be received by at least one of the first communication unit 20a, 40 and the second communication unit 20b, 20c, 20d, . . . , 20n. One advantage with the server 80 is that the search for the lost vehicle key does not need to be initiated at a geographical location that is dependent on the geographical location of the first communication unit 20a, 40.

According to an aspect the server 80 is configured to continuously receive vehicle position information from the first communication unit 20a, 40 and from any second communication unit 20b, 20c, 20d, . . . , 20n.

According to an aspect the position information data in the key request signal REQKEY comprising the key unit position information data. According to an aspect the position information data in the key request signal REQKEY is the key unit position information data associated with the last known geographical location when wireless communication was established between the key unit 10 and the first communication unit 20a, 40. In an example different key units may be associated with different last known locations.

According to an aspect the processing circuitry 102a, 102b, 102c operatively connected to the first communication unit 20a, 40 is further configured to determine if a second communication unit 20b, 20c, 20d, . . . , 20n is located at a geographical location corresponding to the position information data comprised in the find key request signal REQKEY and in accordance with a determination that a second communication unit 20b, 20c, 20d, . . . , 20n is located at a geographical location corresponding to the position information data comprised in the find key request signal REQKEY, sending the detect key signal DKS to the second communication unit 20b, 20c, 20d, . . . , 20n located at a geographical location corresponding to the position information data comprised in the find key request signal REQKEY.

According to an aspect the position information data of the find key request signal REQKEY is one of the position of the first communication unit 20a, 40 or a position information data entered by a user of the first communication unit 20a, 40. This means that in one example the position of the first communication unit 20a, 40 may be included automatically by the first communication unit 20a, 40 based on position information data obtained from the position information unit connected to the first communication unit 20a, 40. This also means that in another example a user can manually enter the position information in the case the position of the first communication unit 20a, 40 is not relevant. In one example a user, e.g. the vehicle occupant, may be in a different location than where the user believe the vehicle keys were lost. According to an aspect the position information data of the find key request signal REQKEY is one of the position of the first communication unit 20a, 40 or a position information data entered by a user of the first communication unit 20a, 40, or the key unit position information data associated with the last known geographical location when wireless communication was established between the key unit 10 and the first communication unit 20a, 40.

According to an aspect, as illustrated in FIG. 2, the detect key signal DKS is configured to be received by at least one of the first communication unit 20a, 40 and the second communication unit 20b, 20c, 20d, . . . , 20n if the at least one of the first communication unit 20a, 40 and the second communication unit 20b, 20c, 20d, . . . , 20n is located within a predetermined distance L from the geographical position given in the position information data of the find key request signal REQKEY. In other words, according to an aspect, the detect key signal DKS is only sent to the first communication unit 20a, 40 and any second communication unit 20b, 20c, 20d, . . . , 20n if they are within a certain distance L from the geographical position given in the position information data of the find key request signal REQKEY. In FIG. 2 this is illustrated with the distance L, that is defining a radius, and in the illustration in FIG. 2, the second vehicles 2c and 2d are located within a predetermined distance L from the geographical position given in the position information data of the find key request signal REQKEY. The detect key signal DKS is sent to the second communication unit 20b, 20c, 20d, . . . , 20n of the second vehicles 2c and 2d.

According to an aspect the first communication unit 20a, 40 and the second communication unit 20b, 20c, 20d, . . . , 20n are configured to re-send the detect key signal DKS to any further second communication unit 20b, 20c, 20d, . . . , 20n arranged in a further vehicle, that is outside of the predetermined distance L from the geographical position given in the position information data of the find key request signal REQKEY. In other words, according to an aspect, the detect key signal DKS may be sent to any further second communication unit 20b, 20c, 20d, . . . , 20n that is outside of the distance L from the geographical position given in the position information data of the find key request signal REQKEY. In FIG. 2 this is exemplified by the vehicle 2b that is outside of the predetermined distance L from the geographical position given in the position information data of the find key request signal REQKEY. The second communication unit of vehicle 2c re-sends the detect key signal DKS to any further second communication unit 20b, 20c, 20d, . . . , 20n, and the second communication unit 20b, 20c, 20d, . . . , 20n of vehicle 2b pick up the detect key signal DKS. Vehicle 1 and vehicle 2b are also outside of the predetermined distance L from the geographical position given in the position information data of the find key request signal REQKEY but not within radio coverage of any vehicle within the predetermined distance L from the geographical position given in the position information data of the find key request signal REQKEY.

According to an aspect the processing circuitry 102a, 102b, 102c is further configured to send the found key signal FKS to the server 80 via at least one of the first communication unit 20a, 40 and the second communication unit 20b, 20c, 20d, . . . , 20n, receive the found key signal FKS at the server 80 and send a find key response signal RESKEY from the server 80 to the first communication unit 20a, 40. In one example a notification message based on the find key response signal RESKEY can be presented to the vehicle occupant via a user interface 400 of the first communication unit 20a, 40.

According to an aspect the key unit 10 is further configured to receive input from a user to manually activate the found key signal FKS. An advantage with this aspect is that if the vehicle key is lost and found by a person, that person can activate a continuously transmission of a found key signal FKS. The key unit 10 may have a button that says e.g. "press here" or "finder of this key press here to notify owner" etc. According to an aspect a manually activation of the found key signal FKS initiates a continuous broadcast of the found key signal FKS. FIG. 2 illustrates a key 5 that further comprises a button F configured to activate the found key signal FKS when pressed.

According to an aspect the key localization system 100 comprises a plurality of second communication units 20b, 20c, 20d, . . . , 20n, and wherein the second communication units 20b, 20c, 20d, . . . , 20n are comprised in one vehicle 2b, 2c, 2d, . . . , 2n each and wherein each one of the second communication units 20b, 20c, 20d, . . . , 20n is configured for wireless communication with at least one other second communication unit 20b, 20c, 20d, . . . , 20n. According to an aspect the plurality of second communication units 20b, 20c, 20d, . . . , 20n create a mesh network using any of a direct, dynamic and/or non-hierarchy wireless communication with each other over a local area communication network. This means that in one example the search area is defined by the number of vehicles that are within the radio coverage of each other. If for example a vehicle key is lost at a parking lot or along a street with plural vehicles, the search area may only be limited by e.g. a number of re-transmissions or by a preset lifetime. This means that plural vehicles 2b, 2c, 2d, . . . , 2n can assist in the search for the lost vehicle key.

Figure 3:
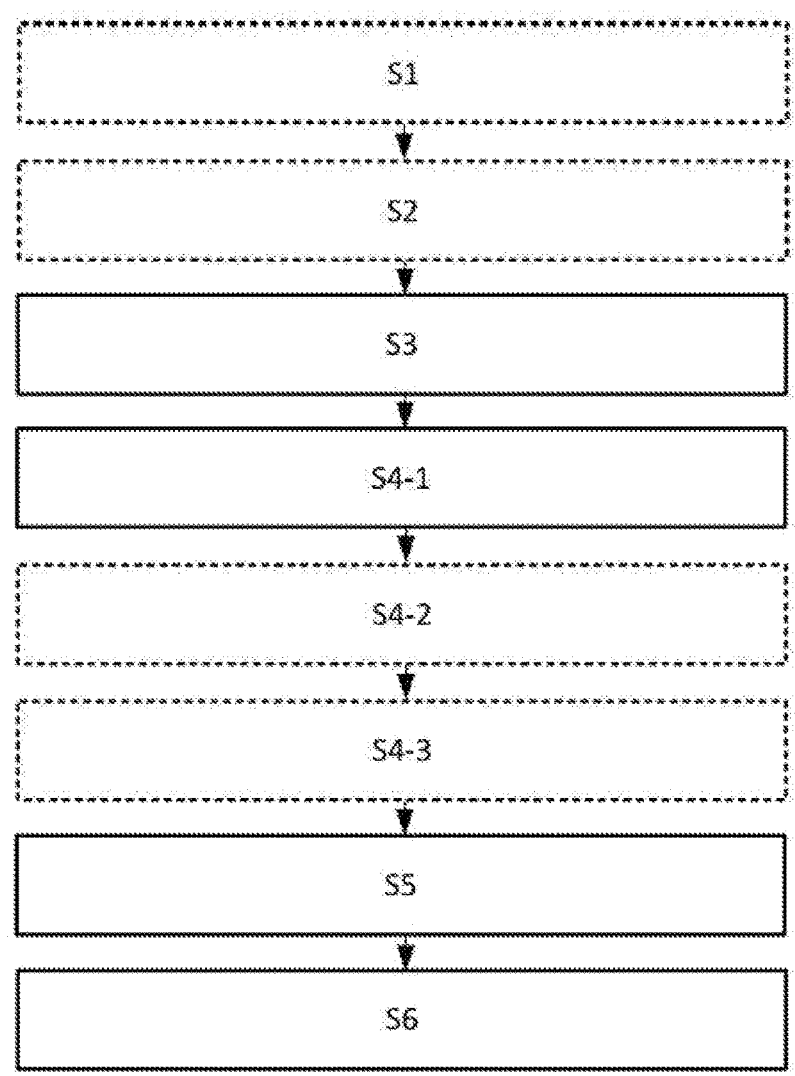
FIG. 3 illustrates a flow chart of the method steps according to some aspects of the disclosure.

The disclosure further proposes a method for finding a vehicle key. FIG. 3 illustrates a flow chart of the method steps according to some aspects of the disclosure. The method comprising the step S3 sending via a first communication unit 20a, 40, a detect key signal DKS configured to be received by at least one of a key unit 10 and a second communication unit 20b, 20c, 20d, . . . , 20n and the step S4-1 receiving via the first communication unit 20a, 40, in response to that the key unit 10 has received the detect key signal DKS, a found key signal FKS from at least one of the key unit 10 and the second communication unit 20b, 20c, 20d, . . . , 20n. One advantage with that the first communication unit 20a, 40, the second communication unit 20b, 20c, 20d, . . . , 20n and the key unit 10 are configured to be in wireless communication with each other is that the vehicle occupant, that is searching for the lost vehicle key 5, can be helped in the search for the lost vehicle key by extending a visual search area by a search area that is covered using wireless communication that covers a broader search area.

According to an aspect the method further comprising the step S5 sending via the first communication unit 20a, 40, a key alert signal KAS configured to be received by at least one of the key unit 10 and the second communication unit 20b, 20c, 20d, . . . , 20n and in response to receiving the key alert signal KAS at the key unit 10, the step 6 generating an alert in the key unit 10 for indicating the location of the key unit 10 to a person in the vicinity of the key unit 10. This means for example that the vehicle occupant can initiate an alert in the key unit 10 via the first communication unit 20a, 40 that will simplify the search for the lost vehicle key.

According to an aspect the method further comprising the step S1 receiving at a server 80, a find key request signal REQKEY, sent from the first communication unit 20a, 40, comprising key identification data and position information data, and the step S2 sending from the server 80 a detect key signal DKS configured to be received by at least one of the first communication unit 20a, 40 and the second communication unit 20b, 20c, 20d, . . . , 20n. One advantage with this aspect is that the search for the lost vehicle key does not need to be initiated at a geographical location that is dependent on the geographical location of the first communication unit 20a, 40.

According to an aspect the method further comprising the step S4-2 sending the found key signal FKS to a server 80 via at least one of the communication unit 20a, 40 and the vehicle communication unit 20b, 20c, 20d, . . . , 20n, receiving the found key signal FKS at the server 80, and the step S4-3 sending a find key response signal RESKEY from the server 80 to the first communication unit 20*a*, 40. In one example a notification message based on the find key response signal RESKEY can be presented to the vehicle occupant via a user interface 400 of the first communication unit 20*a*, 40.

According to an aspect the key localization system 100 is configured to carry out any or more of the aspects of the described method.

Figure 4:
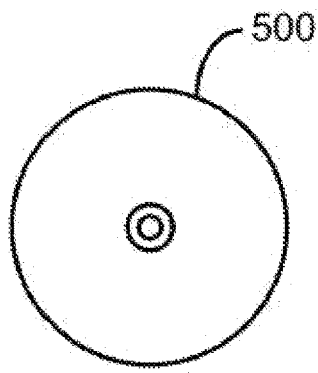
FIG. 4 illustrates a computer program product according to some aspects of the disclosure.

The disclosure further proposes a computer program product 500 comprising a non-transitory computer readable medium, having thereon a computer program comprising program instructions, the computer program being loadable into a processing circuitry 102*a*, 102*b*, 102*c* and configured to cause execution of the method according to any of claims 18 through 21 when the computer program is run by the at least one processing circuitry 102*a*, 102*b*, 102*c*. FIG. 4 illustrates a computer program product according to some aspects of the disclosure.

According to an aspect of the disclosure, the method is carried out by instructions in a software program that is downloaded and run in the display system.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A key localization system for finding a vehicle key, wherein the key localization system comprises:
   a key unit connected to the vehicle key and configured for wireless communication;
   a first communication unit configured for receiving input from a user of the first communications unit indicative of a request to find the vehicle key and configured to establish wireless communication with the key unit;
   at least one second communication unit comprised in a vehicle and configured for wireless communication with the first communication unit, and the key unit configured for wireless communication with at least one of the first communication unit and the at least one second communication unit; and
   a processing circuitry operatively connected to the first communication unit and configured to cause the key localization system to:
      receive at a server, a find key request signal, sent from the first communication unit, comprising key identification data and position information data, the position information data comprising at least one of a position of the first communication unit, a position entered by the user, or a last known geographic location of wireless communication between the key unit and the first communication unit;
      send from the server a detect key signal configured to be received by at least one of the first communication unit or the second communication unit;
      send, via at least one of the first communication unit or the second communication unit, the detect key signal configured to be received by the key unit;
      receive, at the server, in response to that the key unit has received the detect key signal, a found key signal.

2. The key localization system according to claim 1, wherein the first communication unit is configured to be associated with the key unit, the first communication unit being comprised in a first vehicle and the at least one second communication unit being comprised in a second vehicle.

3. The key localization system according to claim 1, wherein the first communication unit is configured to be associated with the key unit and wherein the first communication unit is comprised in a portable communication device.

4. The key localization system according to claim 1, wherein the second communication unit is configured to establish wireless communication with the key unit.

5. The key localization system according to claim 1, wherein the found key signal received comprises vehicle position information for determining the geographical location of the vehicle comprising the second communication unit.

6. The key localization system according to claim 1, wherein the processing circuitry is further configured to:
   send, via the first communication unit, a key alert signal configured to be received by at least one of the key unit or the second communication unit; and
   in response to receiving the key alert signal at the key unit, generate an alert in the key unit for indicating the location of the key unit to a person in the vicinity of the key unit.

7. The key localization system according to claim 1, wherein the second communication unit is configured to receive and re-send at least one of the detect key signal or the found key signal.

8. The key localization system according to claim 1, wherein the detect key signal is configured to be received by at least one of the first communication unit or the second communication unit that is located within a predetermined distance from the geographical position given in the position information data of the find key request signal.

9. The key localization system according to claim 1, wherein the processing circuitry is further configured to:
   send the found key signal to the server via at least one of the first communication unit or the second communication unit; and
   receive a find key response signal from the server to the first communication unit.

10. The key localization system according to claim 1, wherein the key unit is further configured to receive input from a person to manually activate the found key signal.

11. A method for finding a vehicle key in a key location system having:
   a key unit connected to the vehicle key and configured for wireless communication;
   a first communication unit configured for receiving input from a user of the first communications unit indicative of a request to find the vehicle key and configured to establish wireless communication with the key unit;
   at least one second communication unit comprised in a vehicle and configured for wireless communication with the first communication unit, and the key unit configured for wireless communication with at least one of the first communication unit and the at least one second communication unit; and
   a processing circuitry operatively connected to the first communication; and
   wherein the method comprises:
      receiving, at a server, a find key request signal, sent from a first communication unit, comprising key identification data and position information data, the position information data comprising at least one of a position of the first communication unit, a position entered by the user, or a last known geographic location of wireless communication between the key unit and the first communication unit;

sending, from the server, a detect key signal configured to be received by at least one of the first communication unit or a second communication unit;

sending, via at least one of a first communication unit or the second communication unit, the detect key signal configured to be received by at least one of a key unit; and receiving, at the server, in response to that the key unit has received the detect key signal, a found key signal.

12. A non-transitory computer readable medium storing a computer program comprising program instructions for execution in a key location system having:

a key unit connected to the vehicle key and configured for wireless communication;

a first communication unit configured for receiving input from a user of the first communications unit indicative of a request to find the vehicle key and configured to establish wireless communication with the key unit;

at least one second communication unit comprised in a vehicle and configured for wireless communication with the first communication unit, and the key unit configured for wireless communication with at least one of the first communication unit and the at least one second communication unit; and a processing circuitry operatively connected to the first communication; and wherein the computer program being loadable into the processing circuitry and, when the computer program is run by the processing circuitry, cause the key localization system to:

receive at a server, a find key request signal, sent from the first communication unit, comprising key identification data and position information data, the position information data comprising at least one of a position of the first communication unit, a position entered by the user, or a last known geographic location of wireless communication between the key unit and the first communication unit;

send from the server a detect key signal configured to be received by at least one of the first communication unit or the second communication unit;

send, via at least one of the first communication unit or the second communication unit, the detect key signal configured to be received by the key unit; and receive, at the server, in response to that the key unit has received the detect key signal, a found key signal.

* * * * *